United States Patent
Tabuchi

(10) Patent No.: US 11,597,836 B2
(45) Date of Patent: Mar. 7, 2023

(54) POLYETHERETHERKETONE-CONTAINING RESIN COMPOSITION AND SEAL RING

(71) Applicant: NOK CORPORATION, Tokyo (JP)

(72) Inventor: Yuhei Tabuchi, Ibaraki (JP)

(73) Assignee: NOK CORPORATION

( * ) Notice: Subject to any disclaimer, the term of this patent is extended or adjusted under 35 U.S.C. 154(b) by 352 days.

(21) Appl. No.: 16/954,339

(22) PCT Filed: Aug. 8, 2019

(86) PCT No.: PCT/JP2019/031523
§ 371 (c)(1),
(2) Date: Jun. 16, 2020

(87) PCT Pub. No.: WO2020/036129
PCT Pub. Date: Feb. 20, 2020

(65) Prior Publication Data
US 2021/0079214 A1   Mar. 18, 2021

(30) Foreign Application Priority Data

Aug. 14, 2018 (JP) .............................. JP2018-152759

(51) Int. Cl.
C08G 65/40 (2006.01)
C08L 71/00 (2006.01)
C09K 3/10 (2006.01)
F16J 15/3284 (2016.01)

(52) U.S. Cl.
CPC ................ C08L 71/00 (2013.01); C09K 3/10 (2013.01); F16J 15/3284 (2013.01); C08L 2205/025 (2013.01); C08L 2207/20 (2013.01); C09K 2200/0657 (2013.01)

(58) Field of Classification Search
USPC ........................ 524/494; 528/271, 272, 274
See application file for complete search history.

(56) References Cited

U.S. PATENT DOCUMENTS

| | | | |
|---|---|---|---|
| 5,750,266 A | 5/1998 | Sakata | |
| 5,836,589 A | 11/1998 | Sakata | |
| 5,886,080 A | 3/1999 | Mori | |
| 2003/0129413 A1 | 7/2003 | Greiner et al. | |
| 2017/0057163 A1* | 3/2017 | Chaplin | ................ B33Y 10/00 |
| 2018/0186971 A1 | 7/2018 | Herring et al. | |

FOREIGN PATENT DOCUMENTS

| | | |
|---|---|---|
| JP | H07-156216 A | 6/1995 |
| JP | H8-159292 A | 6/1996 |
| JP | H08-291257 A | 11/1996 |
| JP | 1053700 A * | 2/1998 |
| JP | H10-053700 A | 2/1998 |
| JP | 2000-515230 A | 11/2000 |
| JP | 2001-138329 A | 5/2001 |
| JP | 2001-225351 A | 8/2001 |
| JP | 2002-160244 A | 6/2002 |
| JP | 2002-370257 A | 12/2002 |
| JP | 2003-517076 A | 5/2003 |
| JP | 8159292 A * | 11/2004 |
| JP | 2005-307090 A | 11/2005 |
| JP | 2006-249187 A | 9/2006 |
| JP | 2018-519410 A | 7/2018 |
| JP | 8291257 A * | 6/2019 |
| NO | 98/04853 A1 | 2/1998 |

OTHER PUBLICATIONS

Notice of Reasons for Refusal for corresponding Japanese Application No. 2020-537443 dated Jan. 18, 2022 with English translation (10 Pages).

* cited by examiner

*Primary Examiner* — Terressa Boykin
(74) *Attorney, Agent, or Firm* — Harness, Dickey & Pierce, P.L.C.

(57) ABSTRACT

A resin composition includes polyetheretherketone, a polyetheretherketone recycled material, and a filler, wherein a percentage of the recycled material is 25 mass % or higher with respect to a total of the polyetheretherketone and the recycled material; and the filler has a content of from 5 to 30 mass % and has an aspect ratio of from 1 to 3.

3 Claims, 2 Drawing Sheets

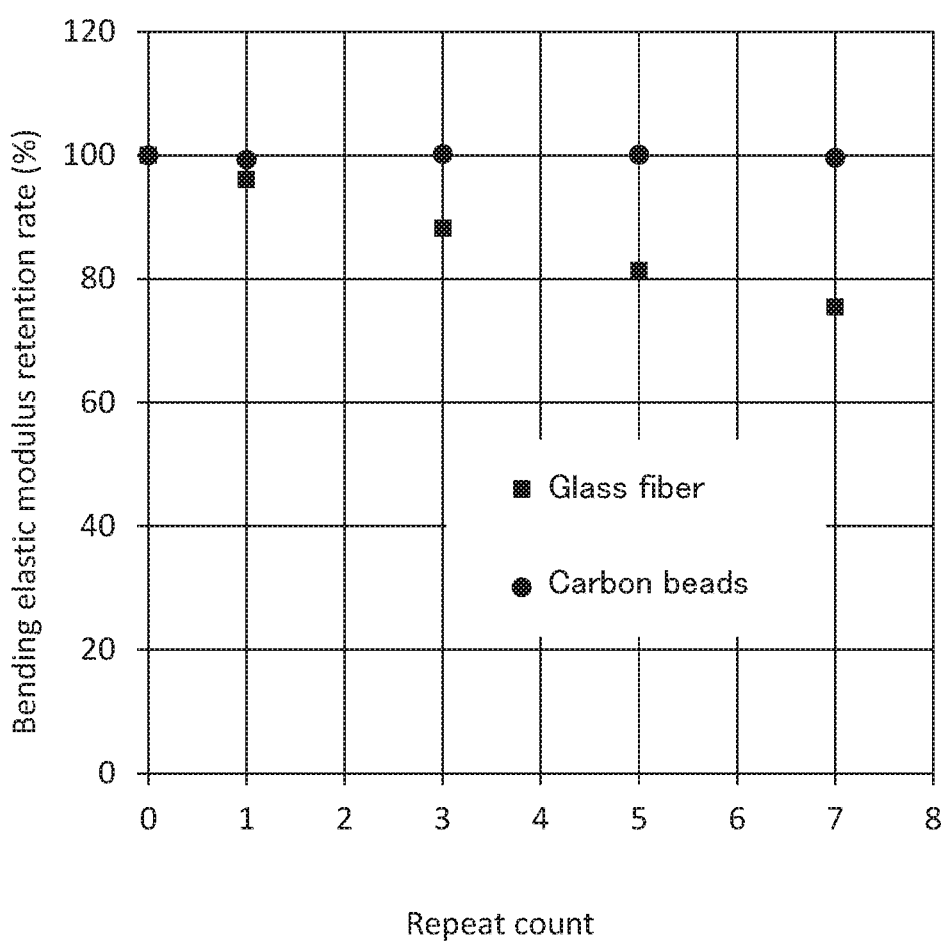

POLYETHERETHERKETONE-CONTAINING RESIN COMPOSITION AND SEAL RING

CROSS REFERENCE TO RELATED APPLICATIONS

This application is a U.S. National Phase application of International Application No. PCT/JP2019/031523, filed on Aug. 8, 2019 and published in Japanese as WO2020/036129 on Feb. 20, 2020 and claims priority to Japanese Patent Application No. 2018-152759, filed on Aug. 14, 2018. The entire disclosures of the above applications are expressly incorporated by reference herein.

BACKGROUND

Technical Field

The invention relates to a polyetheretherketone-containing resin composition and a seal ring containing of the resin composition.

Related Art

Each resin composition containing a filler and an engineering plastic with excellent thermal stability and mechanical strength has been used instead of metallic material to produce a light-weight product and/or has been applied to, for instance, a seal material to improve its durability, heat resistance, and so on when used. Among the engineering plastics, polyetheretherketone (hereinafter, referred to as PEEK) excels in performance on any of heat resistance, chemical resistance, flame retardancy, mechanical properties, and others and has been known as a super engineering plastic.

While being a high-performance material, PEEK has also been known as a more expensive material among generally expensive super engineering plastics. Because of this, various studies have been conducted so as to reduce its usage while the excellent characteristics of PEEK are exploited. For instance, Japanese Patent Application Publication No. 2006-249187 discloses an automatic transmission (AT)-use seal ring containing a resin composition having excellent abrasion resistance and low invasiveness even if the content of PEEK is reduced to 65% by weight or less.

However, although usage of PEEK can be reduced in the invention of Japanese Patent Application Publication No. 2006-249187, how to improve the yield of a PEEK-containing resin composition has not been examined.

A PEEK-like thermoplastic resin-containing resin composition may be, for instance, subject to injection molding as follows. First, a molten thermoplastic resin is transferred through a sprue part of a molding machine to a mold. Next, while the inlet velocity is controlled at a runner part and a gate part in the mold, the thermoplastic resin is transferred into a product portion and then cooled. After that, portions other than the product, namely solidified unused thermoplastic resins remaining in the sprue part, gate part, and runner part, etc., are removed and the resin composition is so molded into the product. Hence, in the injection molding process, part of the thermoplastic resin is always wasted continuously.

Because PEEK is expensive as mentioned above, a PEEK-containing resin composition may be recycled as a recycled material obtained from a resin composition removed at the time of injection molding. This should improve the yield and thus reduce the cost. In this regard, however, the recycled material has poorer strength than a resin composition that has not experienced the recycling step. If the content of the recycled material is 25% or higher with respect to the resin composition, a desirable strength is unlikely to be obtained. In this way, it is difficult to increase usage of the recycled material. Accordingly, the yield cannot be said to be sufficiently improved just by using the recycled material.

In view of the above situations, the invention address the problem of providing a resin composition that contains PEEK, a PEEK recycled material, and a filler and has a low strength reduction factor even when 25 mass % or more of the PEEK recycled material is included with respect to the PEEK.

SUMMARY

The present inventor has conducted intensive research on why the strength of a recycled material is reduced, in order to actually provide a resin composition such that the strength thereof is retained even if a large amount of the recycled material is included.

The recycled material is prepared by crushing an unused resin composition. This recycled material may be subjected to injection molding and the resin composition in a sprue part, etc., may be further repeatedly used as a recycled material. In this case, the resin composition undergoes the crushing step many times. In the crushing step as so repeated, filler fiber in the resin composition is cut and the fiber length is shortened. This seems to be a cause for a decrease in the strength of the recycled material.

Then, the present inventor has taken a step forward in examining a filler in which crushing hardly causes a decrease in the fiber length. As a result, it has been found that if the filler has an aspect ratio of 3 or less, it is possible to markedly suppress the decrease in the strength of the recycled material. Specifically, the invention has the following configuration.

The invention provides a resin composition comprising polyetheretherketone, a polyetheretherketone recycled material, and a filler, wherein a percentage of the recycled material is mass % or higher with respect to a total of the polyetheretherketone and the recycled material; and the filler has a content of from 5 to 30 mass % and has an aspect ratio of from 1 to 3.

Advantageous Effects of Invention

The invention makes it possible to provide a resin composition including PEEK, a PEEK recycled material, and a filler and having a low strength reduction factor even when 25 mass % or higher of the PEEK recycled material is included with respect to the PEEK.

BRIEF DESCRIPTION OF THE DRAWINGS

FIG. 3 is a graph showing a change in bending elastic modulus retention rate after a recycling step is repeated.

DETAILED DESCRIPTION

Figure 1:
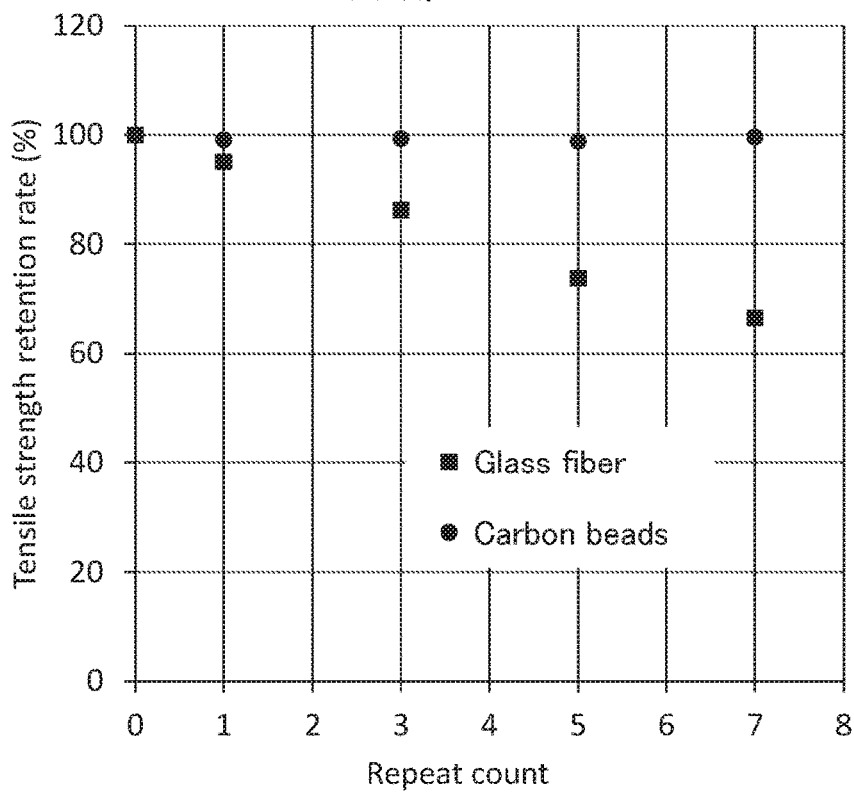
FIG. 1 is a graph showing a change in tensile strength retention rate after a recycling step is repeated.

The following describes, in detail, embodiments of the invention. However, the scope of the invention is not limited to the below-described embodiments.

Resin Composition

A resin composition of the invention contains polyetheretherketone (PEEK), a PEEK recycled material, and a filler.

The recycled material can be repeatedly used in the resin composition of the invention. Thus, the cost can be reduced to produce even a high-performance resin composition with a large content of PEEK.

Hereinafter, components of this resin composition will be described.

Polyetheretherketone

PEEK used herein is an aromatic polyether ketone and may be obtained by performing a desalting polycondensation reaction between 4,4'-difluorobenzophenone and a hydroquinone dipotassium salt. Examples of a commercially available PEEK product include "VICTREX-PEEK 150P" manufactured by Victrex plc. and "VESTAKEEP 1000 P" manufactured by Daicel-Evonik Ltd. These commercially available products may be used as they are in the invention.

The PEEK in the resin composition has a content of preferably from 70 to 95 mass % and more preferably from 75 to 90 mass %. Note that the content of PEEK herein refers to the total amount of PEEK mixed in the resin composition and PEEK included in the PEEK recycled material mixed in the resin composition.

When the content of PEEK is 70 mass % or higher, the resulting molded product is rigid. Also, when the content of PEEK is 95 mass % or lower, the filler-mediated reinforcement effect can be adequately exerted.

Filler

The filler may be mixed with a resin to increase, for instance, the heat resistance, strength, abrasion resistance, and/or dimensional stability of the resin.

Examples of the filler that can be used include glass beads, carbon beads, coke breeze, bronze powder, and phenol resin beads. Among these fillers, glass beads and/or carbon beads are preferable. More preferred are carbon beads because they are unlikely to disintegrate during a crushing step in manufacture of the below-described recycled material.

Substances that can be used for the filler are not limited to the above. Here, those having a too large aspect ratio are difficult to be used.

The filler aspect ratio means a ratio of the length/the diameter of the filler. That is, a filler with a large aspect ratio has an elongated shape and is vulnerable to a crushing step in manufacture of the below-described recycled material.

A bead-shaped filler with an aspect ratio of from 1 to 3 is used herein. The aspect ratio is preferably from 1 to 2 and more preferably from 1 to 1.2.

When the aspect ratio is 3 or less, the aspect ratio is unlikely to be changed after the crushing step is repeated. Accordingly, the material physical properties are not easily deteriorated and as a result of which the effect of reinforcing the resin composition can be maintained.

The filler has an average particle size of preferably from 5 to 100 μm and more preferably from 25 to 50 μm. The average particle size of the filler may be measured with a laser diffraction particle size analyzer.

When the average particle size is 5 μm or more, the resulting molded product can have enhanced abrasion resistance. Also, when the average particle size is 100 μm or less, the resulting molded product is rigid.

The filler content is from 5 to 30 mass % and preferably from 10 to 25 mass % with respect to the resin composition. Note that the filler content refers to the total amount of filler mixed in the resin composition and filler included in the PEEK recycled material mixed in the resin composition.

When the filler content is 5 mass % or more, the filler-mediated reinforcement effect can be adequately exerted. Also, when the filler content is 30 mass % or less, the resin composition can include a sufficient amount of PEEK. This causes the resulting molding to be rigid.

Recycled Material

As described above, solidified resin compositions remaining in, for instance, the sprue part, gate part, and runner part and resin compositions to be wasted usually, such as products that have been determined to have defects due to injection molding failure, are crushed with a crusher and are then utilized as recycled materials.

After a resin mixed with the recycled material is subjected to injection molding, a resin composition to be wasted again occurs. Whenever this process is repeated, the resin composition to be obtained undergoes the crushing step. The present inventor has examined what kinds of effects the repeated crushing step exerts on the strength of the recycled material as follows.

Figure 2:
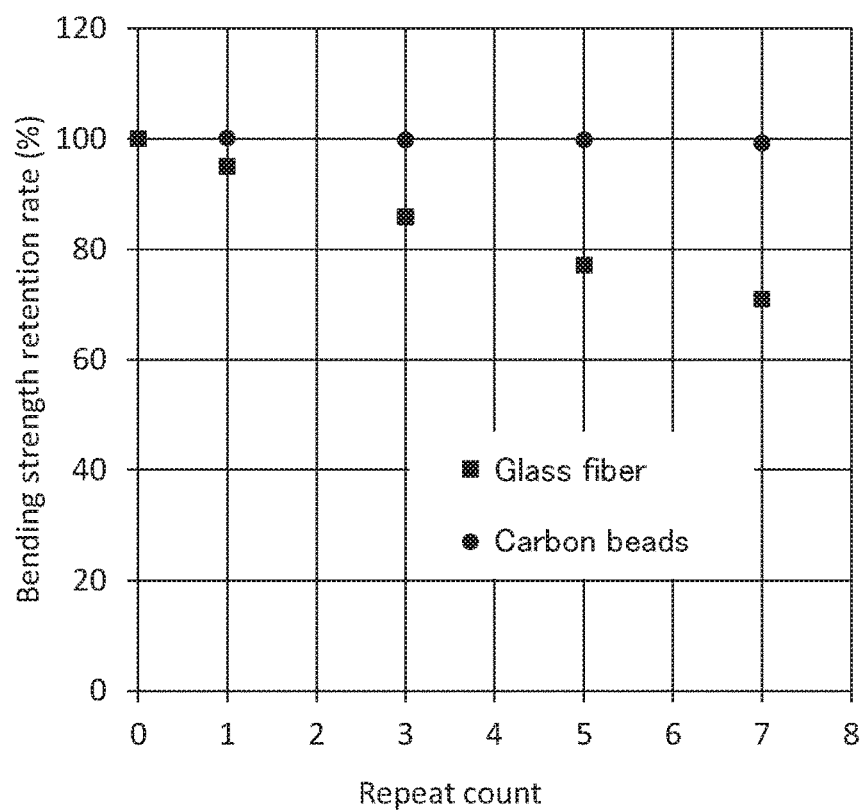
FIG. 2 is a graph showing a change in bending strength retention rate after a recycling step is repeated.

FIGS. 1 to 3 are graphs showing the comparison about the strength retention rate measured with respect to the original strength while a recycling process is repeated by using both a resin composition containing 15 mass % of carbon beads and a resin composition containing 15 mass % of glass fiber as a filler. The recycling process herein specifically means repeating a step in which a dumbbell-shaped molding is produced by injection molding; this molding is crushed and then melted; and a dumbbell-shaped molding is again produced by injection molding.

PEEK was used as a resin used in the resin composition. The carbon beads used had an average particle size of 40 μm and an aspect ratio of from 1 to 1.1. The glass fiber used was milled fiber having an average diameter of 10 μm and a length of 0.3 mm. The aspect ratio of this glass fiber is calculated to be 30.

FIG. 1 shows a change in the tensile strength retention rate. The tensile strength retention rate of the resin composition using carbon beads exhibits almost no change after the recycling process is repeated. By contrast, the tensile strength retention rate of the resin composition using glass fiber is markedly decreased to 95.1% after the first-time recycling process, 86.2% after the third time, 73.8% after the fifth time, and 66.5% after the seventh time.

FIG. 2 shows a change in the bending strength retention rate. The bending strength retention rate of the resin composition using carbon beads exhibits almost no change after the recycling process is repeated. By contrast, the bending strength retention rate of the resin composition using glass fiber is markedly decreased to 95.0% after the first-time recycling process, 85.9% after the third time, 77.2% after the fifth time, and 71.0% after the seventh time.

FIG. 3 shows a change in the bending elastic modulus retention rate. The bending elastic modulus retention rate of the resin composition using carbon beads exhibits almost no change after the recycling process is repeated. By contrast, the bending elastic modulus retention rate of the resin composition using glass fiber is markedly decreased to 96.1% after the first-time recycling process, 88.2% after the third time, 81.4% after the fifth time, and 75.5% after the seventh time.

As such, after the repeated crushing step, a decrease in the strength is unlikely to occur in the recycled material from the resin composition, in which a bead-shaped filler with a small aspect ratio has been used. In conclusion, use of such a recycled material makes it possible to produce a high-strength resin composition even after a relatively large amount of the recycled material is mixed.

Resin Composition Usage

A resin composition of the invention can be used for various parts including, for instance, gears, bearings, washers, seals, and clutch rings of vehicles.

Because PEEK is included, a composition of the invention excels in thermal stability, abrasion resistance, and chemical resistance and is thus fit for seal rings among various parts as mentioned above. The composition is suitable for automatic transmission-use seal rings among the seal rings.

EXAMPLES

Hereinafter, Examples are used to describe the invention in more detail.

Example 1

Recycled Material

First, 85 mass % of PEEK (VICTREX-PEEK 150P, manufactured by Victrex plc.) and 15 mass % of glass beads (UB-47LA, manufactured by UNITIKA LTD.; with an aspect ratio of 1 to 1.1 and an average particle size of 80 μm) were mixed with a twin-screw extruder to prepare a pellets. These pellets were molded, using an injection molding machine, into a molding. This molding was crushed with a crusher to prepare a material. This material was again molded, using a molding machine, into a molding, which was then crushed. This process was repeated a total of seven times. Then, a recycled material in Example 1 was produced.

Resin Composition

First, 85 parts by mass of PEEK containing the recycled material in Example 1 in an amount of 30 mass % and 15 mass % of the glass beads were mixed to prepare a resin composition of Example 1.

Example 2

First, 85 parts by mass of PEEK containing the recycled material in Example 1 in an amount of 50 mass % and 15 mass % of the glass beads were mixed. The other conditions were the same as those of Example 1 and a resin composition of Example 2 was then obtained.

Example 3

Recycled Material

First, 85 mass % of PEEK and 15 mass % of carbon beads (Marilin GC-050, manufactured by Gunei Chemical Industry Co., Ltd.; with an aspect ratio of 1 to 1.1 and an average particle size of 40 μm) were mixed. The other conditions were the same as those of Example 1 and a recycled material in Example 3 was then produced.

Resin Composition

First, 85 parts by mass of PEEK containing the recycled material in Example 3 in an amount of 30 mass % and 15 mass % of the carbon beads were mixed. The other conditions were the same as those of Example 1 and a resin composition of Example 3 was then obtained.

Example 4

First, 85 parts by mass of PEEK containing the recycled material in Example 3 in an amount of 50 mass % and 15 mass % of the carbon beads were mixed. The other conditions were the same as those of Example 1 and a resin composition of Example 4 was then obtained.

Comparative Example 1

Recycled Material

First, 85 mass % of PEEK and 15 mass % of glass fiber (EFH150-31, manufactured by Central Glass Co., Ltd.; with an average diameter of 10 μm, a length of 0.3 mm, and an aspect ratio of 2 to 60) were mixed. The other conditions were the same as those of Example 1 and a recycled material in Comparative Example 1 was then produced.

Resin Composition

First, 85 parts by mass of PEEK containing the recycled material in Comparative Example 1 in an amount of 30 mass % and 15 mass % of the glass fiber were mixed. The other conditions were the same as those of Example 1 and a resin composition of Comparative Example 1 was then obtained.

Comparative Example 2

First, 85 parts by mass of PEEK containing the recycled material in Comparative Example 1 in an amount of 50 mass % and 15 mass % of the glass fiber were mixed. The other conditions were the same as those of Example 1 and a resin composition of Comparative Example 2 was then obtained.

Comparative Example 3

Recycled Material

First, 85 mass % of PEEK and 15 mass % of carbon fiber (S-2415, manufactured by Osaka Gas Chemicals Co., Ltd.; with an average diameter of 10 μm, a length of 0.2 mm, and an aspect ratio of 2 to 40) were mixed. The other conditions were the same as those of Example 1 and a recycled material in Comparative Example 3 was then produced.

Resin Composition

First, 85 parts by mass of PEEK containing the recycled material in Comparative Example 3 in an amount of 30 mass % and 15 mass % of the carbon fiber were mixed. The other conditions were the same as those of Example 1 and a resin composition of Comparative Example 3 was then obtained.

Comparative Example 4

First, 85 parts by mass of PEEK containing the recycled material in Comparative Example 3 in an amount of 50 mass % and 15 mass % of the carbon fiber were mixed. The other conditions were the same as those of Example 1 and a resin composition of Comparative Example 4 was then obtained.

Examples and Comparative Examples were used to evaluate each of the following items.

Tensile Strength Retention Rate

Each of the tensile strength of a resin composition free of a recycled material (hereinafter sometimes referred to as a recycled material-free product) and the tensile strength of a resin composition containing a recycled material (hereinafter sometimes referred to as a recycled material-containing product) was measured in accordance with ASTM D638. The following equation was used to calculate a tensile strength retention rate.

Tensile strength retention rate (%)=(Tensile strength of recycled material-containing product/Tensile strength of recycled material-free product)×100.

Evaluation standard: when the tensile strength retention rate between the resin compositions was 95% or higher, the standard was passed.

Bending Strength Retention Rate

Each of the bending strength of a recycled material-free product and the bending strength of a recycled material-containing product was measured in accordance with ASTM D790. The following equation was used to calculate a bending strength retention rate.

Bending strength retention rate (%)=(Bending strength of recycled material-containing product/Bending strength of recycled material-free product)×100.

Evaluation standard: when the bending strength retention rate between the resin compositions was 95% or higher, the standard was passed.

Bending Elastic Modulus Retention Rate

Each of the bending elastic modulus of a recycled material-free product and the bending elastic modulus of a recycled material-containing product was measured in accordance with ASTM D790. The following equation was used to calculate a bending elastic modulus retention rate.

Bending elastic modulus retention rate (%)=(Bending elastic modulus of recycled material-containing product/Bending elastic modulus of recycled material-free product)×100.

Evaluation standard: when the bending elastic modulus retention rate between the resin compositions was 95% or higher, the standard was passed.

Table 1 shows the evaluation results.

strength of each recycled material was prevented using a bead-shaped filler with a small aspect ratio.

Comparative Examples 1 to 4 were found to fail to pass any of the acceptance standards regarding the retention rates measured. Even in Comparative Examples 1 and 3, where the PEEK recycled material content was 30% and relatively small, any of the retention rates measured was below 95%.

The invention claimed is:

1. A resin composition comprising:
    a polyetheretherketone homopolymer;
    a polyetheretherketone recycled material; and
    a filler,
    wherein
    the polyetheretherketone recycled material comprises a polyetheretherketone homopolymer and a carbon bead or a glass bead;
    a total content of the polyetheretherketone homopolymer and the polyetheretherketone homopolymer in the polyetheretherketone recycled material, in the resin composition is in a range of 70 to 95 mass %;
    a percentage of the polyetheretherketone recycled material is 25 mass % or higher with respect to a total of the polyetheretherketone homopolymer and the polyetheretherketone recycled material;
    the filler has a content of from 5 to 30 mass % and has an aspect ratio of from 1 to 3;
    the filler includes a carbon bead or a glass bead; and
    each of a tensile strength retention rate, a bending strength retention rate, and a bending elastic modulus retention rate of the resin composition are 95% or higher.

2. The resin composition as claimed in claim 1 wherein the filler has an average particle size of 5 to 100 micrometer.

3. A seal ring comprising the resin composition as claimed in claim 1.

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Resin Composition | Filler | Glass beads | Glass beads | Carbon beads | Carbon beads | Glass fiber | Glass fiber | Carbon fiber | Carbon fiber |
| | Recycled Material Content (mass %) | 30 | 50 | 30 | 50 | 30 | 50 | 30 | 50 |
| Evaluation | Tensile Strength Retention Rate (%) | 98.4 | 99.4 | 98.8 | 98.8 | 94.5 | 89.5 | 92.7 | 87.5 |
| | Bending Strength Retention Rate (%) | 99.7 | 98.7 | 100.0 | 98.7 | 94.8 | 88.9 | 93.2 | 88.5 |
| | Bending Elastic Modulus Retention Rate (%) | 100.0 | 102.3 | 100.0 | 98.3 | 93.9 | 88.7 | 92.8 | 87.6 |

The results of Table 1 have revealed the following.

The resin compositions of Examples 1 to 4 were found to pass all the acceptance standards with respect to the tensile strength retention rate, the bending strength retention rate, and the bending elastic modulus retention rate. In Examples 2 and 4, where the PEEK recycled material content was 50% and relatively large, all the retention rates measured exceeded 98%. This has demonstrated that a decrease in the

* * * * *